Nov. 3, 1942.  A. AMIGO  2,300,760
MOLDING OF ARTICLES BY REINFORCED SYNTHETIC RESINS
Filed March 31, 1939  2 Sheets-Sheet 1

Inventor,
A. Amigo
by Glascock Downing & Seebold
Attys.

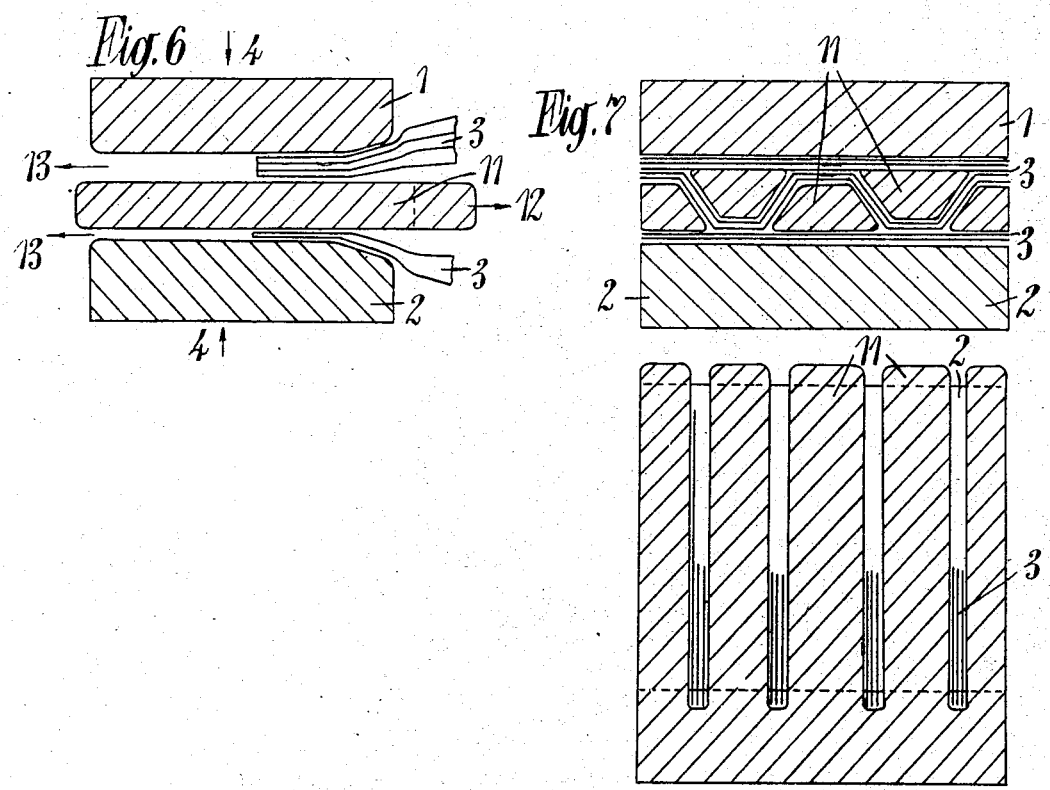

Patented Nov. 3, 1942

2,300,760

UNITED STATES PATENT OFFICE 2,300,760

MOLDING OF ARTICLES BY REINFORCED SYNTHETIC RESINS

Alfonso Amigo, London, England, assignor of one-half to Ebonestos Industries Limited, London, England Application March 31, 1939, Serial No. 265,346
In Great Britain February 11, 1939

6 Claims. (Cl. 18—55)

The manufacture of molded articles by means of synthetic resins has a certain limitation so far as size is concerned. The limit is determined by the cost of the mold and of the installation as compared with the smallness of the orders generally associated with large articles.

Another difficulty frequently encountered is the manufacture of hollow bodies which are open on one side and of rings, the inner diameter of which is larger in some places than the open passages.

An object of the present invention is to provide a method by which the difficulties referred to are overcome and to open new fields of application as regards the molding of synthetic resins.

According to the present invention use is made of a number of superposed sheets or bands or assembly of strands or threads of felt-like fibrous or other suitable material, such as fabric or paper, or of a single piece of felted fibrous material impregnated with synthetic resins and hereinafter referred to as a "packet of impregnated laminations or felted fibrous material." The packet referred to is passed between two or more molding plates of any desired shape and subjected to pressure not as a whole but in parts. First of all one portion of the article to be molded is shaped by subjecting the packet whilst stationary to heat and pressure until only the surface of the said portion has hardened sufficiently to lose its stickiness, whereupon the packet is fed forward and another portion of the article to be molded is similarly shaped and hardened on the surface while stationary, the said first portion being subjected to at least one further pressure treatment to complete its hardening, the consecutive portions of the article to be molded being subjected to the same shaping and hardening treatment in a stationary position until the whole article has been shaped and hardened.

The dimensions of the molding plates are substantially smaller than those of the packet, the mold being open in two or more directions.

Generally, adjacent parts will be pressed in succession on one another. In the case of flat structures the treatment of the packet will first be carried out throughout its length and then throughout its width, or vice-versa. If use were made of molding plates with sharp edges, the marginal parts would have to abut exactly against one another, which would be very difficult and leave, neverthless, noticeable signs. The marginal parts are therefore caused to overlap and for this purpose they are left in a soft state, or not hardened. This is attained by giving the edges of the molding plates a gradual curvature, leaving between them a larger space than between the inner surfaces of the molds, whereby a gradual decrease in pressure and delay of the hardening effect is obtained in the region of the edges.

The continuation of the shaping and hardening process may be effected after the whole packet has been shaped or immediately after each first forming has been carried out. In the first case use is made of final hardening molds similar to those used for the preliminary hardening, and in the second case the packet of impregnated laminations is completely hardened while passing through a single mold, the preliminary hardening being effected at the entrance end and the final hardening at the outlet end of the mold.

If necessary the process hereinbefore described may be continued by a cooling process under pressure in cooling molds. In this way there is obtained a continuous process with intermittent feed, and intervals of rest between the feeding steps, during which intervals the preliminary and final pressures and the pressures with cooling effect are carried out.

If molds are used which are curved in the direction in which the packet is moved forward, then the packet leaves the mold correspondingly curved. In this way one can obtain structures which may be poined together by a final pressure to form a closed ring. In this case, the laminations are superposed on one another preferably relatively displaced, so that the joining together of the two ends will produce a joint of uniform thickness without any reduction in its strength, since the abutment of the two ends of each lamination will be staggered relatively to the abutment of the two ends of the adjacent lamination.

Use may be made of successive molds of different cross-section, or of molds of similar cross-section but of different curvature, which makes it possible to produce structures, of any kind and of any desired dimensions with a relatively small number of small molds.

By inserting removable mandrels into the packet of laminations and by pressing correspondingly shaped molds from the outside against them, tubular or hollow-plate-like structures of any desired length can be obtained.

In the case of cross-sections which are curved in different directions, by feeding the packet of impregnated laminations first in the direction of one of the curvatures and then turning it in the direction of the other curvature, dome-like or spherically shaped articles are obtained.

When the process is carried out in one continuous press, the molding plates may comprise three consecutive regions: a first hot region intended for the preliminary shaping and initial hardening, the inlet portion having a gradual curvature so that the pressure is gradually decreased towards the inlet edges; a second hot region for continuing the hardening, which may be made integral with the first region; and a cooling region heat insulated from the preceding hot region. The length of packet to be treated in each of the two hot regions depends on the thickness of the packet.

Corrugated moldings may also be obtained by using correspondingly shaped molding plates, the invention being applied in the manner above described by treating the packet in a first pressure stage to effect the shaping and initial hardening and continuing the hardening in a following pressure stage or stages.

Hollow plates of great length and the strength of which is very high as compared with their weight may be obtained, by placing side by side within the packet a plurality of removeable mandrels of any desired shape, rectangular, trapezoidal, the laminations lying between the said mandrels as well as between the latter and the molding plates.

The technical advantage of making tubular and hollow plate-like bodies according to the present invention lies in this, that it is much easier to withdraw the short mandrels out of the molded part and manufacture long lengths of moldings than in the processes hitherto employed, wherein use is made of long mandrels which are difficult to remove, whilst the lengths of the moldings are at the same time comparatively very limited.

Referring to the accompanying drawings:

Fig. 6 illustrates the molding of hollow or tubular bodies;

Figs. 7 and 7a illustrate in sectional elevation and cross-section the molding of hollow plate-like bodies.

Figure 1:
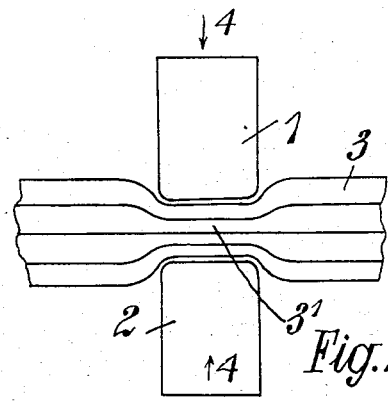
Figs. 1 and 1a illustrate in elevation and plan view the principle of shaping according to the invention.
Figure 1A:
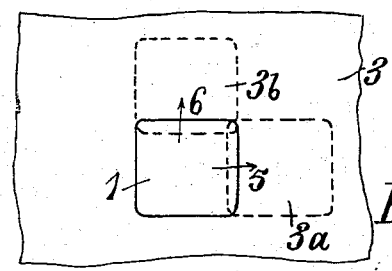

The principle of the shaping is illustrated in Figures 1 and 1a, in which 1 and 2 are the molds, 3 is the impregnated packet and 3' is the part of the packet on which the pressure of the molds is applied, the arrows 4 indicating the direction in which the pressure is applied on to the packet, and the arrows 5 and 6 indicating the direction in which the molds may be shifted, longitudinally or transversely with respect to the packet 3 in order to shape the next following part 3a or 3b. It is, of course, to be understood that, instead of the molds being moved, the packet 3 may be shifted relatively to the molds.

Figure 2:
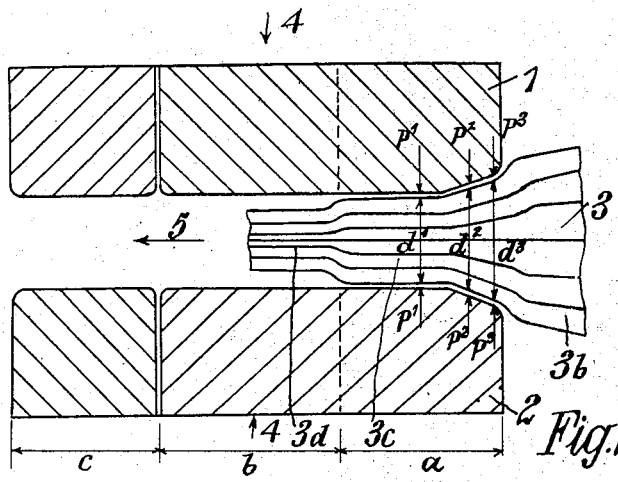
Fig. 2 illustrates the principle of successive shaping and hardening in different regions according to the invention and the feature of securing a reduced pressure at the marginal zones of the molds.

The principle of shaping of the successive parts of the packet is illustrated in Figure 2, in which 1 and 2 are molding plates, 3 is the impregnated packet and the arrow 4 shows the direction in which the pressure is applied. The molding plates comprise the hot shaping and initial hardening region $a$, the hot hardening region $b$ which is made integral with the region $a$, and the cooling region $c$ which is heat insulated with respect to the other regions. The arrow 5 indicates the direction in which the packet 3 is fed forward. 3b indicates the part of the packet which has not yet been subjected to pressure, 3c the part which is being subjected to pressure and shaped in the region $a$ and 3d the part which after it has been preshaped is further hardened in region $b$. By feeding the packet in the direction of the arrow 5, the hardened part reaches the cooling region $c$ and then leaves the mold in its finished form. The length of the parts 3c and 3d depends upon the thickness of the layer to be subjected to pressure, since the duration of the hardening period and consequently the number of times the packet has to come through the region $b$ depends thereon. The molds may be made of any desired width.

Figure 2 illustrates a further feature of the invention, namely, that at the inlet end the edges of the molding plates are tapered or gradually curved, so that the thickness $d_1$, $d_2$, $d_3$ of the packet gradually increases towards the outside and the pressure $p_1$, $p_2$, $p_3$ is correspondingly decreased, since the resistance offered by the material to the compression is reduced.

Figure 3:
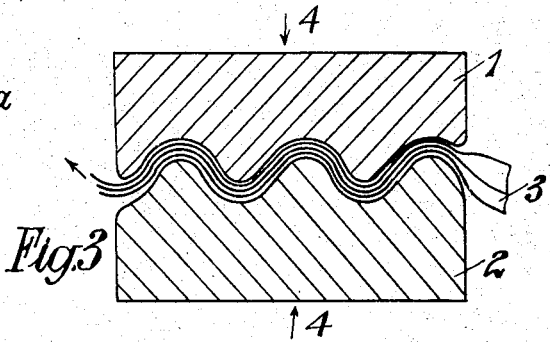
Fig. 3 illustrates in cross-section the molding of a corrugated article.

Figure 3 illustrates the molding of a corrugated article. The length of the pressure application in this case depends upon the length of the wave.

Figure 4:
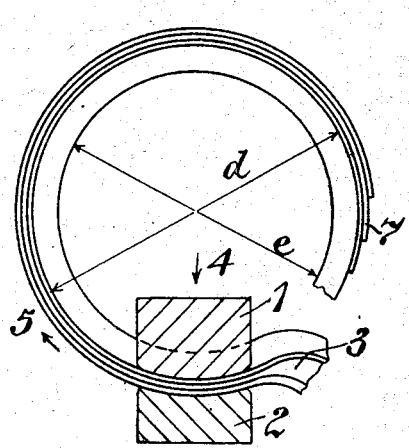
Figs. 4 and 4a illustrate in two positions at right-angles to one another the molding of a ring-shaped article.
Figure 4A:
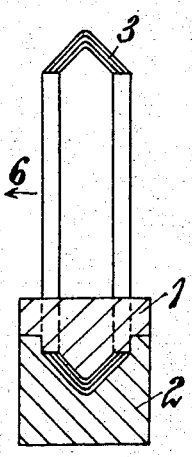

Figures 4 and 4a illustrate the method of manufacture of a ring or annular article, and more particularly of one having such a cross-section that the inner diameter of a portion thereof is larger than the open ends of the ring. 1 and 2 are the molds and 3 is the impregnated packet. It will be seen that in this case the inner surfaces of the molds are curved to have the shape of the arc of a circle in the direction in which the packet is fed, or in the direction of the arrow 5, the packet leaving the molds with the same curvature as that of the molds.

In this example the inner surfaces of the molds are V-shaped in cross-section, as will be seen in Figure 4a, so that the inner diameter of the ring when completed is greater than the diameter of the end openings of the ring; compare $d$ with $e$ in Figure 4. It will be seen that when the ring is completed and the molds 1, 2 are separated, the ring can easily be removed in the direction of the arrow 6.

In order that the ring may be of uniform strength the two ends of the packet from which the ring is formed are stepped, as shown at 7 at one of the ends, to fit on to one another when the ring is completed by the application of a final pressure. The same method is applicable to annular articles of any cross-section.

Figure 5:
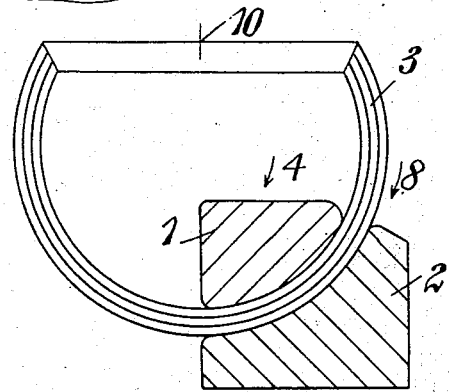
Figs. 5 and 5a illustrate in sectional elevation and in plan view respectively the molding of an article which is dome-shaped.
Figure 5A:
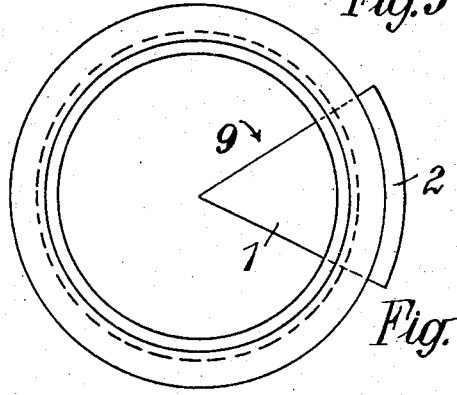

Figures 5 and 5a show the manufacture of an article having the shape of part of a sphere. The packet 3 is subjected to pressure between two correspondingly shaped mold parts 1 and 2. 8 and 9 are the two directions along which the packet is fed to obtain part of a spherically shaped body with 10 as the axis of rotation.

It will be seen that, as in the case of manufacture of rings, also in this case, by separating the mold parts 1, 2 the dome-like shaped body can easily be removed.

Figure 6 shows the method of making hollow or tubular bodies of any desired length. A movable mandrel 11, of circular, square, rectangular or any other desired cross-section, is provided between the molds 1 and 2, which are correspondingly shaped, the packet coming to lie between the molds and the mandrel. After one pressure application, the mandrel is first withdrawn in the direction of the arrow 12 and the packet is fed in the direction of the arrows 13, whereupon the mandrel is also shifted in the direction of the arrows 13 and pressure is again applied; the various steps are repeated in succession until the desired length of hollow body or tube is obtained.

By placing a number of mandrels 11 next to one another, as shown in Figures 7 and 7a, and by leading laminations of the packet between the mandrels and the molds, as well as between the individual mandrels, hollow plate-like bodies of any desired length are obtained, the strength of which as compared with their weight is exceedingly high.

What I claim is:

1. A method of molding articles from a packet of laminations or felted fibrous material impregnated with synethetic resins, comprising the first step of shaping one portion of the article to be molded by subjecting the packet while stationary to heat and pressure until only the surface of said portion has hardened sufficiently to lose its stickiness, the second step of feeding another portion of the article to be molded and shaping and hardening only the surface while the packet is stationary, and a third step of subjecting said first portion and the other portion to at least one further pressure and heat treatment to complete its hardening and a repetition of the said steps in succession with further portions of the article to be molded until the whole article has been shaped and hardened.

2. A method of molding articles as claimed in claim 1, consisting in applying to the marginal zones of the portions treated in the first step a pressure which is less than the pressure applied to the remainder of the said portions, whereby the said zones are enabled to retain their activity.

3. A method of molding articles from a packet of laminations or felted fibrous material impregnated with synthetic resins, comprising the first step of shaping one portion of the article to be molded by subjecting the packet while stationary to heat and pressure until only the surface of said portion has hardened sufficiently to lose its stickiness, the pressure applied to the marginal zones of said portion being less than the pressure applied to the remainder thereof, whereby the said zones are enabled to retain their activity, the second step of feeding another portion of the article to be molded and shaping and hardening only the surface while the packet is stationary and thereafter subjecting the latter portion together with the marginal zones of the first portion to a further pressure and heat treatment and the third step of subjecting said first portion together with its marginal zones and the other portion to at least one further pressure and heat treatment to complete its hardening and a repetition of the said steps in succession with further portion of the article to be molded until the whole article has been shaped and hardened.

4. A method of molding articles as claimed in claim 1, in which the series of three steps of treatment is carried out in the longitudinal as well as in the transverse direction of the packet.

5. A method of molding ring-shaped articles from a packet of laminations or felted fibrous material impregnated with synthetic resins and having its two ends stepped to feed on to one another when the ring is formed, comprising the first step of shaping one portion of the ring-shaped article to be molded in the form of an arc of a circle by subjecting the packet while stationary to heat and pressure until only the surface of the said portion has hardened sufficiently to lose its stickiness, the second step of feeding another portion of the ring-shaped article to be molded and shaping and hardening only the surface while the packet is stationary, and the third step of subjecting said first portion and the other portion to at least one further pressure and heat treatment to complete its hardening and a repetition of the said three steps in succession with further portions of the ring-shaped article to be molded until the whole article has been shaped, and, finally, completing the ring by bringing together the two stepped ends of the packet and applying a final pressure thereto.

6. A method of molding articles from a packet of laminations or felted fibrous material impregnated with synthetic resins, comprising the first step of shaping a first portion of the article to be molded by subjecting the packet while stationary to heat and pressure until only the surface of said portion has hardened sufficiently to lose its stickiness, the second step of shaping and hardening on the surface only a second portion of the article to be molded by the application of pressure and heat and during a pre-determined time of this heat and pressure treatment feeding the packet to bring the first portion into position for the subsequent treatment, the third step of subjecting the said first portion to pressure and heat treatment without treating at the same time the second portion, the fourth step of subjecting a third portion of the packet to pressure and heat treatment and during a pre-determined time of this pressure-heat treatment feeding the said second portion into position for a further pressure and heat treatment and a repetition of the said steps in succession with further portions of the article to be molded until the whole article has been shaped and hardened.

ALFONSO AMIGO.